United States Patent
Harden et al.

[11] Patent Number: 6,036,598
[45] Date of Patent: Mar. 14, 2000

[54] CROP PROCESSING ELEMENT FOR A ROTARY COMBINE

[75] Inventors: Philip Alan Harden, Colona; Dohn William Pfeiffer, Moline, both of Ill.; Klaus Adam Braunhardt, Zweibrucken, Germany

[73] Assignee: Deere & Company, Moline, Ill.

[21] Appl. No.: 09/082,770

[22] Filed: May 21, 1998

[51] Int. Cl.[7] .................................................. A01F 12/10
[52] U.S. Cl. ............................ 460/66; 460/69; 460/70; 460/71; 460/80; 56/14.6
[58] Field of Search .................. 460/66, 69, 71, 460/72, 70, 110, 121, 122, 80; 56/14.6

[56] References Cited

U.S. PATENT DOCUMENTS

| | | | |
|---|---|---|---|
| 927,331 | 7/1909 | Dagel | 460/122 |
| 2,159,664 | 5/1939 | Lingren | 460/71 |
| 2,266,806 | 12/1941 | Ronning | 460/71 |
| 4,139,013 | 2/1979 | Hengen | 56/14.6 |
| 4,348,855 | 9/1982 | DePauw et al. | 56/10.2 |
| 4,362,168 | 12/1982 | Hengen et al. | 130/274 |
| 4,796,645 | 1/1989 | Kuchar | 460/71 |
| 4,889,517 | 12/1989 | Strong et al. | 460/66 |
| 4,964,838 | 10/1990 | Cromheeke et al. | 460/66 |
| 5,125,871 | 6/1992 | Gorden | 460/69 |
| 5,192,245 | 3/1993 | Francis et al. | 460/71 |
| 5,192,246 | 3/1993 | Francis et al. | 460/72 |
| 5,376,047 | 12/1994 | Harden et al. | 460/121 |
| 5,556,337 | 9/1996 | Tophinke et al. | 56/14.6 |
| 5,688,170 | 11/1997 | Pfeiffer et al. | 460/69 |

Primary Examiner—Thomas B. Will
Assistant Examiner—Arpad Fabian Kovacs

[57] ABSTRACT

The crop engaging element of the present invention is a hollow structure having a smooth curved convex top portion which terminates in a concave trough before extending into a radially extending lip. The hollow structure is provided with sidewalls and a rear wall. The sidewalls extend upwardly to enclose the sides of the trough. The element is provided with leading and trailing mounting flanges for mounting the element to the exterior surface of a combine rotor.

9 Claims, 3 Drawing Sheets

CROP PROCESSING ELEMENT FOR A ROTARY COMBINE

BACKGROUND OF THE INVENTION

1. Field of the Invention

The invention is directed to a crop processing element that is mounted to the rotor of an rotary combine.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have one or two large rotors arranged along the longitudinal axis of the machine for threshing and separating the harvested crop material. Traditionally different sections of the rotor have different crop engaging assemblies. For example, one proposed rotor has rasp bars and thinning rods in the threshing section and thinning rods in the separating section, See U.S. Pat. No. 4,964,838. In another proposed axial rotor, the threshing section is provided with rasp bars and the separating section is provided with transport bars, See U.S. Pat. No. 4,348,855.

It has also been proposed to use a number of identical blades in both the threshing and separating sections, See U.S. Pat. No. 4,362,168. In addition, the blades may be angled to the longitudinal axis of the rotor and be provided with a slanted leading edge. Another example of identical blades is disclosed in U.S. Pat. No. 5,376,047 wherein the blades are provided with upturned radially extending lip.

SUMMARY

It is an object of the present invention to provide an improved crop engaging element that is used in the threshing section of a rotor in a rotary combine.

The crop engaging element of the present invention is a hollow structure having a smooth curved convex top portion which terminates in a concave trough before extending into a radially extending lip. The element is provided with leading and trailing mounting flanges for mounting the element to the exterior surface of a combine rotor.

DETAILED DESCRIPTION

Figure 1:
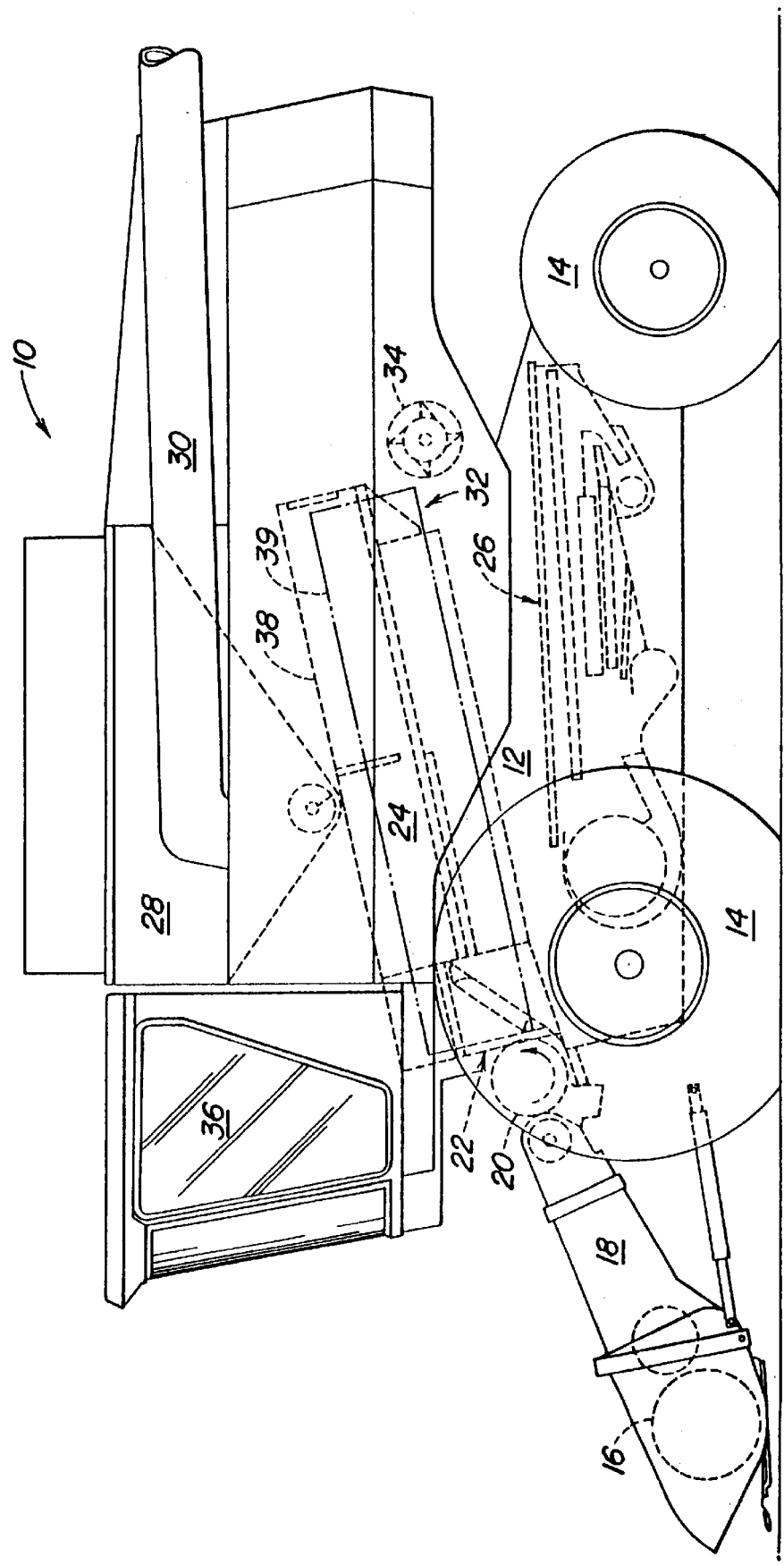
FIG. 1 is a semi-schematic side view of a rotary agricultural combine.
Figure 2:
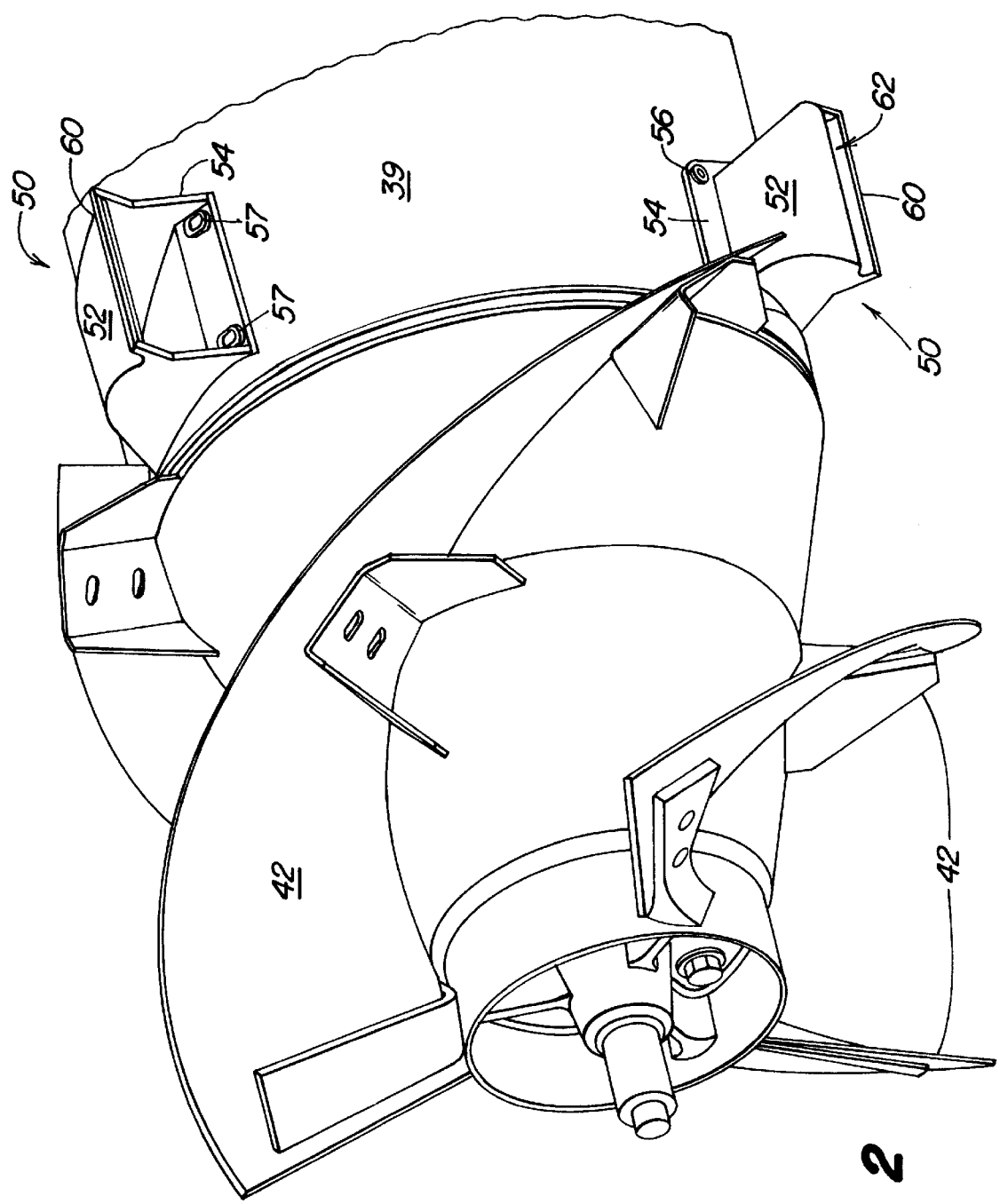
FIG. 2 is a perspective view of the infeed and threshing sections of the rotor.
Figure 3:
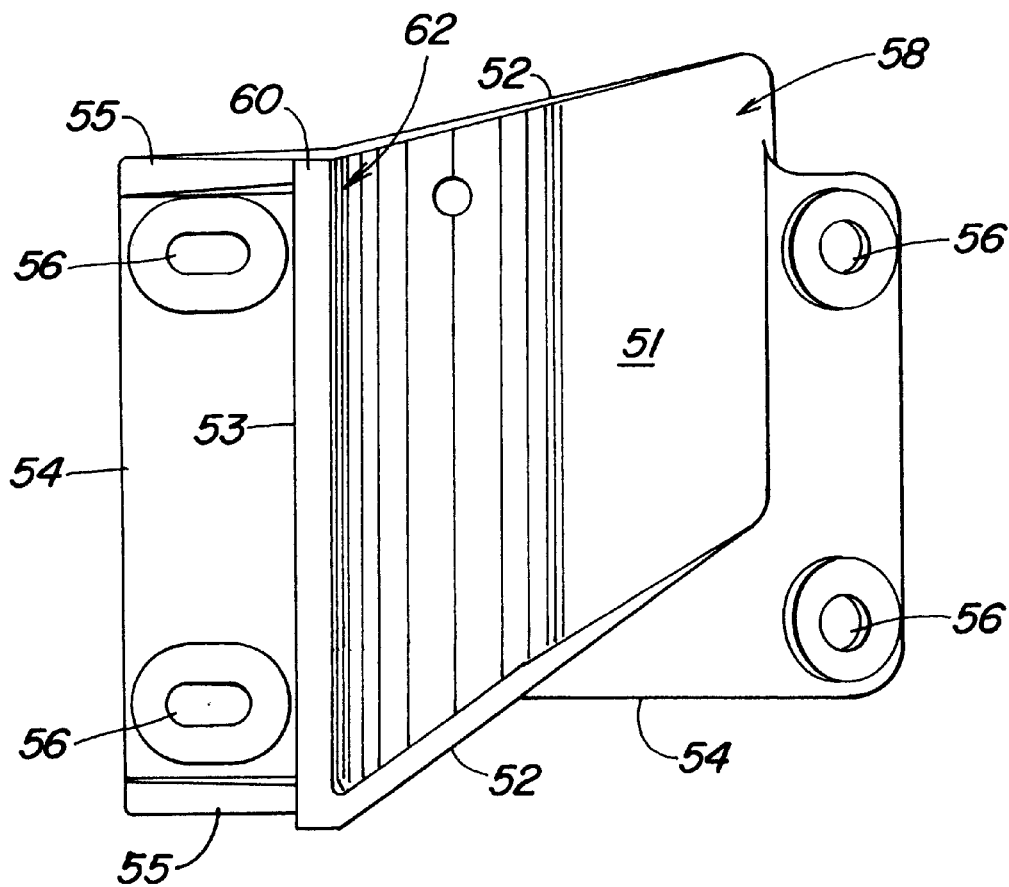
FIG. 3 is a top view of a crop engaging element.
Figure 4:
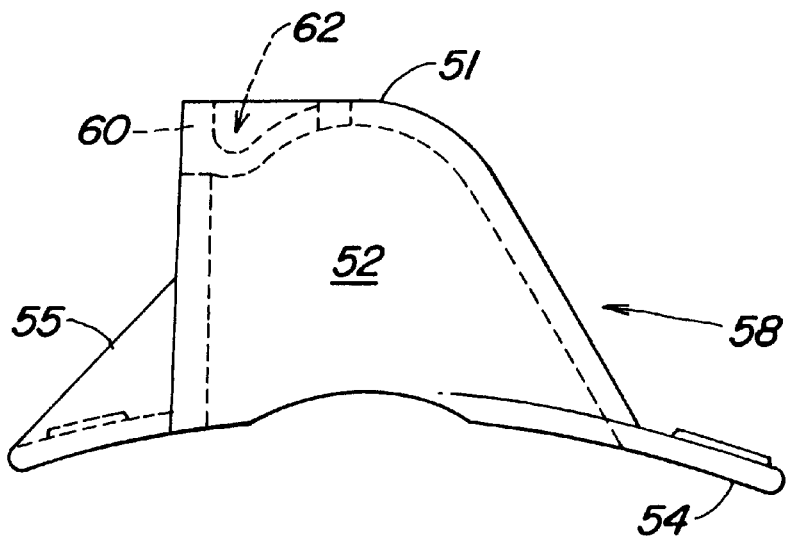
FIG. 4 is a side view of a crop engaging element.

FIG. 1 shows an agricultural combine 10 comprising a supporting structure 12 having ground engaging wheels 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit threshes and separates the harvested crop material. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. The operation of the combine is controlled from operator's cab 36.

The axial crop processing unit comprises a cylindrical rotor housing 38 and a rotor 39 located inside the housing 38. The front part of the rotor and the rotor housing define the infeed section of the crop processing unit. The rotor in this section is provided with a conical drum having helical blades 42 for engaging crop material from the beater 20. Immediately downstream from the infeed section is the threshing section of the crop processing unit. In this section the rotor comprises a cylindrical drum having a number of crop engaging elements 50.

These crop engaging elements 50 comprise hollow structures having a smoothed curved convex top portion 51, side walls 52 and rear wall 53. As shown in FIG. 1 the rear wall is essentially open forming a rectangular frame. The base of the crop engaging element 50 is provided with leading and trailing mounting flanges 54 having mounting apertures 56. Mounting bolts 57 pass through the mounting apertures 56 for securing the crop engaging elements to the rotor. The mounting apertures in the leading mounting flange are circular, whereas the mounting apertures in the trailing mounting flange are slots. The trailing mounting flange is also provided with reinforcing gussets 55 which extend between the flange and the rear wall 53 of the crop engaging element.

The present invention is primarily directed to the shape of the crop engaging element 50. The smooth curved convex portion 51 terminates in concave trough 62. The end of the concave trough is provided with a radially extending lip 60. It should be noted that the sidewalls extend upwardly above the bottom of the trough to close the ends of the concave trough 62 reinforcing the radially extending lip 60.

The crop engaging elements 50 are illustrated as having a smooth curved convex portion 51, which is the preferred embodiment of the invention. However this surface could also be formed with rasp bars to provide more aggressive threshing characteristics.

During threshing the crop material is engaged by the curved convex portion 51 and is compressed against the interior surface of the cylindrical housing 38. This compression is relieved by the concave trough 62 before the crop material is kicked radially outward again by the radially extending lip 60.

The invention should not be limited to the above described embodiment, but should be limited solely by the claims that follow.

We claim:

1. A crop processing unit rotor for a rotary agricultural combine, comprising:
   a cylindrical drum; and
   crop engaging elements mounted to the cylindrical drum, each element is provided with a curved convex top portion terminating in a concave trough and a radially extending lip located adjacent to the trough, the crop engaging element is further provided with a leading mounting flange and a trailing mounting flange for mounting the crop engaging element to the cylindrical drum, the leading mounting flange is provided with at least one circular mounting aperture and the trailing mounting flange is provided with at least one mounting aperture in the form of a slot through which mounting bolts are passed to mount the crop engaging element to the cylindrical drum.

2. A rotor as defined by claim 1 wherein the crop engaging element is further provided with two sidewalls wherein the sidewalls extend past the trough thereby enclosing the trough.

3. A rotor as defined by claim 2 wherein the crop engaging element is provided with a rear wall the trailing mounting flange is provided with at least one gusset extending between the trailing mounting flange and the rear wall of the crop engaging element.

4. A rotor as defined by claim 3 wherein the rear wall of the crop engaging element is open forming a rectangular frame.

5. A rotor as defined by claim 1 wherein the curved convex portion forms a smooth surface.

6. A crop engaging element for the rotor of a rotary combine, the crop engaging element comprising:

a hollow structure having a curved convex top portion terminating in a concave trough and a radially extending lip located adjacent to the trough; and a leading mounting flange and a trailing mounting flange extend from the hollow structure for mounting the crop engaging element to a rotor, wherein the leading mounting flange is provided with at least one circular mounting aperture and the trailing mounting flange is provided with at least one mounting aperture in the form of a slot through which mounting bolts are passed to mount the crop engaging element to the rotor.

7. An element as defined by claim 6 wherein the curved convex top portion forms a smooth surface.

8. An element as defined by claim 7 further comprising a rear wall, the trailing mounting flange is provided with at least one gusset extending between the trailing mounting flange and the rear wall.

9. An element as defined by claim 8 wherein the rear wall is open forming a rectangular frame.

* * * * *